Sept. 24, 1957 F. C. HALLDEN 2,807,740

CATHODE-RAY TUBE APPARATUS

Filed Oct. 14, 1955

2 Sheets-Sheet 1

United States Patent Office
2,807,740
Patented Sept. 24, 1957

2,807,740

CATHODE-RAY TUBE APPARATUS

Frederick C. Hallden, Floral Park, N. Y., assignor to Hazeltine Research, Inc., Chicago, Ill., a corporation of Illinois Application October 14, 1955, Serial No. 540,405
6 Claims. (Cl. 313—84)

This invention relates to cathode-ray tube apparatus for compensating for the tendency of a prevailing magnetic field, such as the earth's magnetic field, to cause an undesired deflection of the electron beam produced by a cathode-ray tube during its operation.

It is well known that the earth's magnetic field causes some deflection of the electron beam of a cathode-ray tube during its operation. The magnitude of this deflection is usually relatively small and, hence, is generally ignored. In certain critical operations, however, such as in the case of a color-television receiver of the projection type, this deflection produces an undesired effect which cannot be tolerated. More specifically, a color-television receiver of the projection type utilizes three separate cathode-ray tubes, one for producing a red image, one for producing a green image, and one for producing a blue image. These three images are subsequently superimposed on a suitable viewing screen by way of a suitable mirror arrangement. The deflection by the earth's magnetic field of the electron beam in each cathode-ray tube causes a noticeable departure from the ideal superimposed condition for the three color images on the viewing screen, this discrepancy commonly being referred to as "misregistration." This misregistration occurs because mirrors are used and the three cathode-ray tubes are, of necessity, situated in three different physical locations and, hence, a deflection of the electron beam in each cathode-ray tube in the same direction, as would be caused by the earth's magnetic field, causes corresponding elements of the three color images on the viewing screen to shift in three different directions. This phenomenon of misregistration in a color-television receiver of the projection type is discussed more in detail in the copending application Serial No. 429,941 of William F. Bailey, entitled "Color-Image-Reproducing Apparatus of the Projection Type," filed May 14, 1954. As a result of this tendency of the earth's magnetic field to cause a misregistration of the three superimposed color images, it is desirable that some means be included for compensating for the undesired deflection caused by the earth's magnetic field.

In addition to the earth's magnetic field, operating conditions are sometimes such that other types of magnetic fields exist over the region occupied by a cathode-ray tube and, hence, tend to cause undesired deflection of the electron beam thereof. For example, magnetic fields produced by various circuit components which are energized by a 60-cycle line voltage may cause such undesired deflection of the electron beam.

It is an object of the invention, therefore, to provide new and improved cathode-ray tube apparatus which avoids the foregoing difficulties.

It is another object of the invention to provide new and improved cathode-ray tube apparatus for compensating for the tendency of the earth's magnetic field to cause an undesired deflection of the electron beam of a cathode-ray tube.

In accordance with the invention, apparatus for compensating for the tendency of a prevailing magnetic field to cause an undesired deflection of the electron beam produced by a cathode-ray tube during its operation comprises a cathode-ray tube and ferromagnetic vanes for gathering the flux of the prevailing magnetic field and shaped to alter the direction of the gathered flux to produce a localized field having a direction different from that of the prevailing magnetic field and mounted about the neck of the cathode-ray tube so that the local magnetic field may deflect the electron beam in such a manner as to compensate for any undesired deflection produced by the prevailing magnetic field.

For a better understanding of the present invention, together with other and further objects thereof, reference is had to the following description taken in connection with the accompanying drawings, and its scope will be pointed out in the appended claims.

Referring to the drawings.

Figure 1:
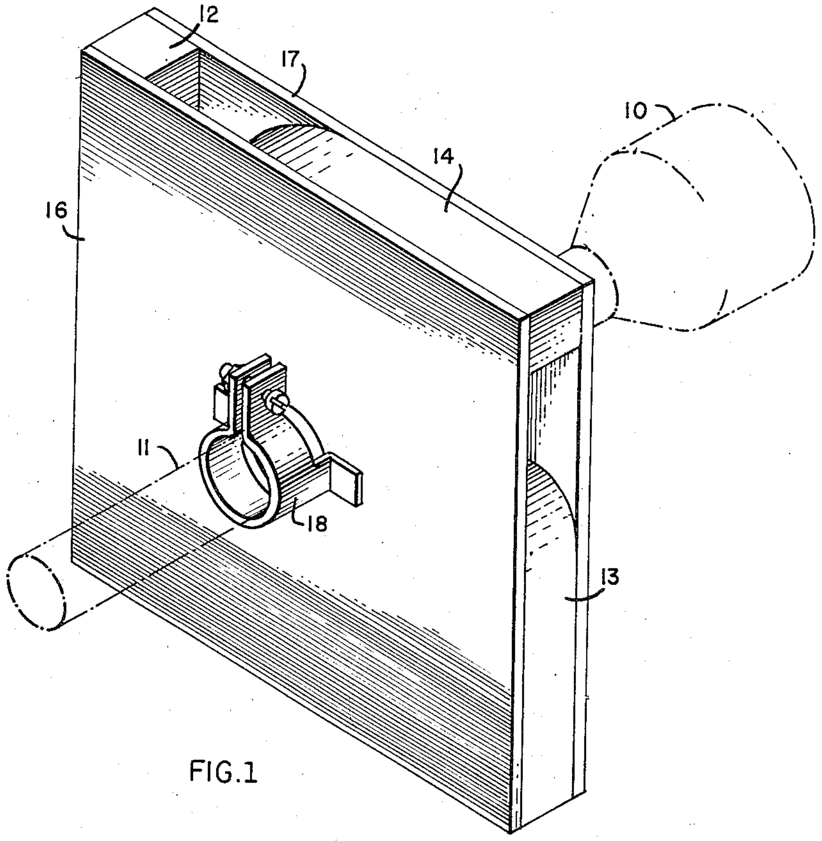
Fig. 1 is a perspective view of cathode-ray tube apparatus constructed in accordance with the present invention.

Referring to Fig. 1 of the drawings, there is shown a cathode-ray tube 10 having a neck portion 11. About the neck 11 is mounted a plurality of ferromagnetic vanes 12–15, inclusive, which are shown in more detail in Fig. 2. These vanes 12–15, inclusive, are attached to a pair of supporting plates 16 and 17 which, in turn, may be attached to the neck of the cathode-ray tube 10 by way of a suitable clamping device 18. The supporting plates 16 and 17 and the clamping device 18 are made of some nonferromagnetic material such as, for example, aluminum.

Figure 2:
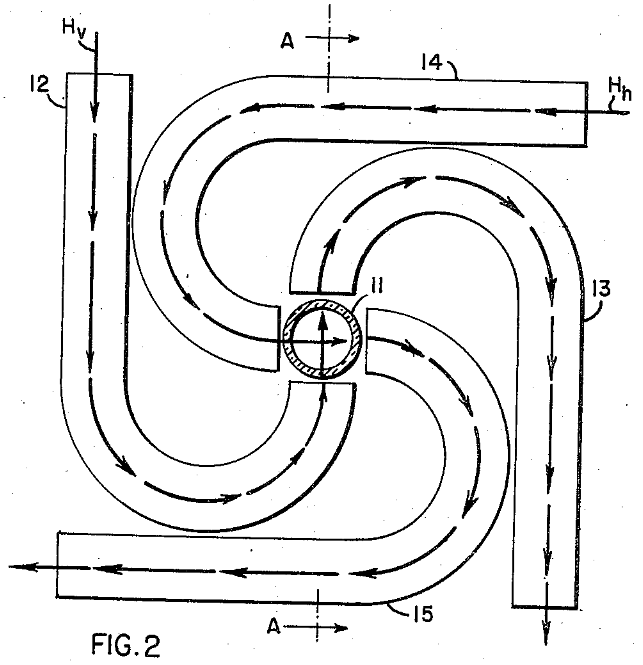
Fig. 2 is a more detailed elevational view of a portion of the apparatus of Fig. 1.

Referring now to Fig. 2, the ferromagnetic vanes 12–15, inclusive, which are individually capable of locally altering the direction of the prevailing magnetic field, which, for the sake of an example, shall hereinafter be taken as the earth's magnetic field, are effective to establish a local magnetic field region wherein the direction of the local field differs from the normal direction of the earth's magnetic field. More specifically, the pair of vanes 12 and 13 is effective to cause a vertical component of the earth's magnetic field to follow a path as indicated by the dashed line $H_v$. Thus, it is apparent that the direction of this vertical component of the earth's magnetic field is reversed over the region of the cathode-ray tube neck at which the vanes 12 and 13 terminate. Similarly, the pair of vanes 14 and 15 is effective to cause the horizontal component of the earth's magnetic field, or, more specifically, the portion of the horizontal component which is at right angles to the axis of the cathode-ray tube 10, to follow the path indicated by the dashed lines $H_h$, thereby producing a horizontal field component of reversed direction over the same region of the cathode-ray tube neck 11. These field components of reversed direction are effective to cause a deflection of the electron beam in a direction opposite to that in which it is normally deflected by the earth's magnetic field. In this manner, the electron beam can be caused to strike the phosphor screen of the cathode-ray tube 10 in the same spot it would have struck if the earth's magnetic field were not present in the first place.

Figure 3:
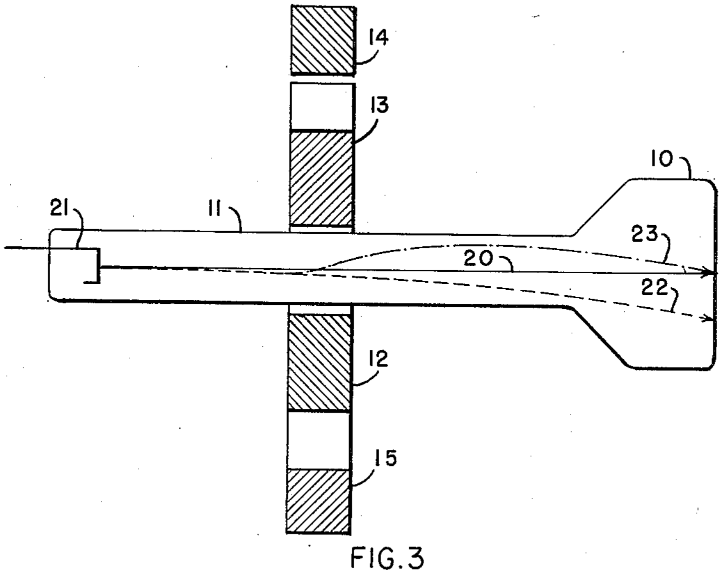
Fig. 3 is a sectional view along the section line A—A of Fig. 2.

Referring now to Fig. 3 of the drawings, the respective electron-beam rays there shown indicate the effect of, for example, the horizontal field components on the path traversed by the electron beam. More specifically, the ray 20 represents the path that would be followed by the electron beam produced by the cathode 21 in the absence of the earth's magnetic field. The ray 22 indicates the deflection in a downward direction caused by the horizontal component of the earth's magnetic field. The ray 23 indicates the path traversed by the electron beam where ferromagnetic vanes in accordance with the present invention are utilized. In this latter case, the reverse direction of the horizontal field component over the region covered by the ferromagnetic vanes causes the electron beam to be deflected upward and, hence, in a direction opposite to the direction in which the beam would be deflected by the normal horizontal component of the earth's magnetic field. As a result, the subsequent deflection of the electron beam due to the earth's magnetic field after it emerges from the region covered by the vanes is effective to deflect the beam in a downward direction so that the resulting spot on the phosphor is located in the same position as it would be in the absence of the earth's magnetic field. Similar considerations are applicable to deflection caused by the vertical component of the earth's magnetic field. Thus, it is apparent that the ferromagnetic vanes of the present invention are effective to compensate for any undesired deflection of the electron beam produced by the earth's magnetic field. The amount of deflection indicated by the electron-beam rays 22 and 23 of Fig. 3 has, of course, been somewhat exaggerated for sake of clarity.

The amount of deflection suffered by an electron beam in a magnetic field depends on both the flux density of the field and the length of time that the beam is in the field. The ratio of flux density over the tube neck region covered by the ferromagnetic vanes 12–15, inclusive, to the flux density due to the earth's magnetic field over the part of the electron-beam path which is not so covered is dependent on the permeability of the ferromagnetic material from which the vanes are made. For each value of this ratio, there is a corresponding ratio for the length of beam path that must be covered by the vanes to the length of beam path that is not so covered in order to give the desired result that the beam strike the phosphor screen in the same spot it would in the absence of the earth's magnetic field. Accordingly, the actual dimensions of the cross section of each vane adjacent the tube neck 11 depend on the permeability of the material selected as well as the length of the cathode-ray tube which is used. The design of the vanes is not primarily dependent on the absolute magnitude of the magnetic field strength of the earth's magnetic field because a variation in the strength of the earth's magnetic field also changes the strength of the compensating field produced by the ferromagnetic vanes by a corresponding amount.

It is preferred that the ferromagnetic vanes of the present invention be located on the cathode side of the beam-focusing apparatus normally associated with the cathode-ray tube. This has the advantage that the magnification of the electron-focus lens can be used to magnify a slight deflection produced by the ferromagnetic vanes so that less deflection need be supplied by the vanes in order to compensate for the subsequent deflection due to the earth's magnetic field. This, of course, permits a reduction in the size of the ferromagnetic vanes.

Where the ferromagnetic vanes are located on the cathode side of the electron-focus lens, it is necessary to take into consideration the focusing action of the electron lens in deciding on the actual shape of the vanes. In the case of cathode-ray tubes using an electrostatic focus lens, the vanes may take the shape as shown in the drawings, that is, they should be shaped so as to cause a reversal of the direction of the field components over the vane-covered region of the tube neck. This is not the case where a magnetic focus lens is used because a magnetic focus lens causes the electrons to follow a spiral path while passing therethrough. As a result, the change in electron-beam direction caused by the focus lens must be taken into account in determining the direction of the field components over the vane-covered region of the tube neck relative to the normal direction of these components. For example, the vanes might be L-shaped in order to change the direction of the field components by a factor of 90°.

Figure 4:
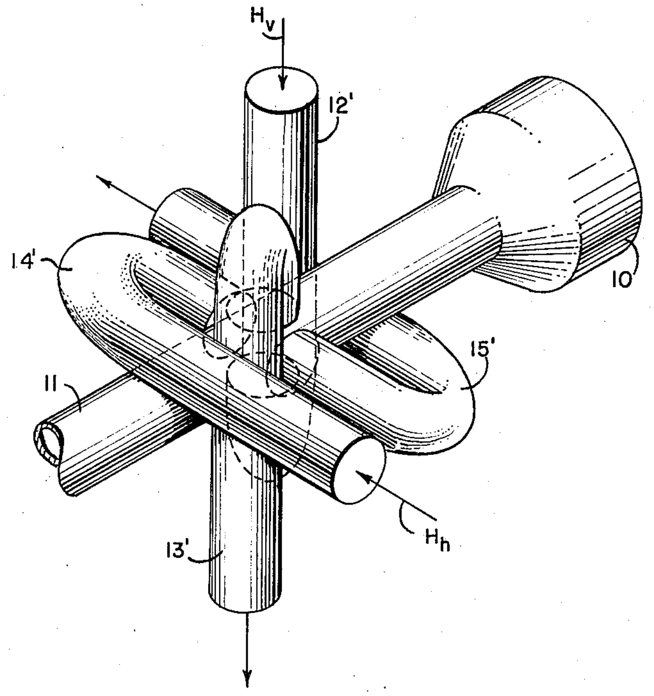
Fig. 4 is a perspective view of a modified form of the cathode-ray tube apparatus of the present invention.

Referring now to Fig. 4 of the drawings, there is shown a modified form of the cathode-ray tube apparatus constructed in accordance with the present invention. For simplicity of illustration, the ferromagnetic vanes 12′–15′, inclusive, are shown as having a circular cross section. This apparatus of Fig. 4 differs from that shown in Figs. 1 and 2 in that the tail of vane 12 has been pivoted around in the forward direction so that it lies against the neck of the cathode-ray tube as shown by vane 12′ of Fig. 4, while the tail of the vane 13 has been pivoted around towards the rear of the cathode-ray tube so that it lies adjacent to the neck of the cathode-ray tube as shown by the vane 13′ of Fig. 4. Similarly, the tails of the vanes 14 and 15 as shown in Figs. 1 and 2 have been pivoted downward and upward, respectively, so as to lie in positions indicated by the corresponding vanes 14′ and 15′ of Fig. 4. The Fig. 4 modification appears to have some advantage over that shown in Figs. 1 and 2 in that coupling of the vertical field component $H_v$ into the horizontal vanes 14′ and 15′ and vice versa for the horizontal field component $H_h$ is considerably minimized. Also, it appears that the Fig. 4 apparatus will require less physical area within the equipment wherein the apparatus is utilized.

From the foregoing description of the various embodiments of the invention, it will be apparent that cathode-ray-tube apparatus constructed in accordance with the present invention represents new and improved apparatus for compensating for the tendency for the earth's magnetic field to cause an undesired deflection of the electron beam of a cathode-ray tube, which is of particular importance in critical applications, such as in a color-television receiver of the projection type, wherein such undesired deflection has a noticeable and objectionable effect.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for compensating for the tendency of a prevailing magnetic field to cause an undesired deflection of the electron beam produced by a cathode-ray tube during its operation, the apparatus comprising: a cathode-ray tube; and ferromagnetic vanes for gathering the flux of the prevailing magnetic field and shaped to alter the direction of the gathered flux to produce a localized field having a direction different from that of the prevailing magnetic field and mounted about the neck of the cathode-ray tube so that the local magnetic field may deflect the electron beam in such a manner as to compensate for any undesired deflection produced by the prevailing magnetic field.

2. Apparatus for compensating for the tendency of a prevailing magnetic field to cause an undesired deflection of the electron beam produced by a cathode-ray tube during its operation, the apparatus comprising: a cathode-ray tube; and partially U-shaped ferromagnetic vanes for gathering the flux of the prevailing magnetic field and shaped to reverse the direction of the gathered flux to produce a localized field having a direction opposite to that of the prevailing magnetic field and mounted about the neck of the cathode-ray tube so that the local magnetic field may deflect the electron beam in a direction opposite to any undesired deflection produced by the prevailing magnetic field.

3. Apparatus for compensating for the tendency of a prevailing magnetic field to cause an undesired deflection of the electron beam produced by a cathode-ray tube during its operation, the apparatus comprising: a cathode-ray tube; and a pair of angular ferromagnetic vanes having adjacent ends positioned adjacent the neck of the cathode-ray tube on opposite sides thereof for gathering the flux of the prevailing magnetic field and shaped to alter the direction of the gathered flux to produce a localized field having a direction different from that of the prevailing magnetic field, the vanes being mounted about the neck of the cathode-ray tube so that the local magnetic field may deflect the electron beam in such a manner as to compensate for any undesired deflection produced by the prevailing magnetic field.

4. Apparatus for compensating for the tendency of a prevailing magnetic field to cause an undesired deflection of the electron beam produced by a cathode-ray tube during its operation, the apparatus comprising: a cathode-ray tube; ferromagnetic vanes for gathering the flux of the prevailing magnetic field and shaped to alter the direction of the gathered flux; means for mounting the vanes in a fixed spatial relationship so that a pair of vanes cooperates to establish a local magnetic field region wherein the direction of the field differs from the normal direction of the prevailing magnetic field; and means for positioning the mounted vanes about the neck of the cathode-ray tube so that the local magnetic field may deflect the electron beam in such a manner as to compensate for any undesired deflection produced by the prevailing magnetic field.

5. Apparatus for compensating for the tendency of the earth's magnetic field to cause an undesired deflection of the electron beam produced by a cathode-ray tube during its operation, the apparatus comprising: a cathode-ray tube; a first pair of angular ferromagnetic vanes for altering the direction of a portion of the horizontal component of the earth's magnetic field to establish a local magnetic field region wherein the direction of the local field is reversed relative to the direction of that portion of the horizontal component of the earth's magnetic field which is at right angles to the axis of the cathode-ray tube; a second pair of angular ferromagnetic vanes for altering the direction of the vertical component of the earth's magnetic field to establish a local magnetic field region wherein the direction of the local field is reversed relative to the direction of the vertical component of the earth's magnetic field; and means for mounting the vanes about the neck of the cathode-ray tube so that the local magnetic field components of reversed direction may deflect the electron beam in such a manner as to compensate for any undesired deflection produced by the horizontal and vertical components of the earth's magnetic field.

6. Apparatus for compensating for the tendency of a prevailing magnetic field to cause an undesired deflection of the electron beam produced by a cathode-ray tube during its operation, the apparatus comprising: a cathode-ray tube; a first pair of angular ferromagnetic vanes for altering the direction of a portion of a first component of the prevailing magnetic field to establish a local magnetic field region wherein the direction of the local field is reversed relative to the direction of that portion of the first component of the prevailing magnetic field which is at right angles to the axis of the cathode-ray tube; a second pair of angular ferromagnetic vanes for altering the direction of a portion of an orthogonal component of the prevailing magnetic field to establish a local magnetic field region wherein the direction of the local field is reversed relative to the direction of that portion of the orthogonal component of the prevailing magnetic field which is at right angles to the axis of the cathode-ray tube; and means for mounting the vanes about the neck of the cathode-ray tube so that the local magnetic field components of reversed direction may deflect the electron beam in such a manner as to compensate for any undesired deflection produced by the two components of the prevailing magnetic field.

References Cited in the file of this patent

UNITED STATES PATENTS

| | | |
|---|---|---|
| 2,459,732 | Bradley | Jan. 18, 1949 |
| 2,513,221 | Webb | June 27, 1950 |
| 2,541,446 | Trott | Feb. 13, 1951 |
| 2,743,389 | Giuffrida | Apr. 24, 1956 |